US010623655B2

United States Patent
Balar et al.

(10) Patent No.: US 10,623,655 B2
(45) Date of Patent: Apr. 14, 2020

(54) IMAGE SENSORS WITH LIGHT FLICKER MITIGATION CAPABILITIES

(71) Applicant: SEMICONDUCTOR COMPONENTS INDUSTRIES, LLC, Phoenix, AZ (US)

(72) Inventors: Bharat Balar, Bengaluru (IN); Sundaraiah Gurindagunta, Vijayawada (IN); Gurvinder Singh, Bangalore (IN)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 48 days.

(21) Appl. No.: 15/992,928

(22) Filed: May 30, 2018

(65) Prior Publication Data
US 2019/0373159 A1    Dec. 5, 2019

(51) Int. Cl.
*H04N 5/235* (2006.01)
*H04N 5/353* (2011.01)
*H04N 5/359* (2011.01)
*H04N 5/378* (2011.01)

(52) U.S. Cl.
CPC ......... *H04N 5/2357* (2013.01); *H04N 5/3535* (2013.01); *H04N 5/3591* (2013.01); *H04N 5/378* (2013.01)

(58) Field of Classification Search
CPC .. H04N 5/2357; H04N 5/3535; H04N 5/3591; H04N 5/378
See application file for complete search history.

(56) References Cited

U.S. PATENT DOCUMENTS

| 9,936,153 | B1* | 4/2018 | Mao ..................... H04N 5/378 |
| 2016/0344965 | A1* | 11/2016 | Grauer ................... H04N 5/353 |
| 2017/0094203 | A1 | 3/2017 | Barna |
| 2017/0163913 | A1* | 6/2017 | Shigeta ............. H04N 5/35581 |
| 2017/0244921 | A1 | 8/2017 | Velichko |
| 2017/0264845 | A1 | 9/2017 | Lee et al. |
| 2017/0366766 | A1 | 12/2017 | Geurts et al. |
| 2018/0115730 | A1* | 4/2018 | Velichko .......... H01L 27/14641 |
| 2019/0229138 | A1* | 7/2019 | Lee .................... H01L 27/14603 |

OTHER PUBLICATIONS

Silsby, et al., "A 1.2MP ⅓" CMOS Image Sensor with Light Flicker Mitigation," 2015 International Image Sensor Norkshop, Jun. 11, 2015, Vaals, The Netherlands.
Velichko et al., "140 dB Dynamic Range Sub-electron Noise Floor Image Sensor", 2017 International Image Sensor Workshop, May 30-Jun. 2, 2017, Hiroshima, Japan.

* cited by examiner

*Primary Examiner* — Nhan T Tran
(74) *Attorney, Agent, or Firm* — Treyz Law Group, P.C.; Tianyi He

(57) ABSTRACT

An image sensor may include image pixels arranged in rows and columns. The image pixels may include an anti-blooming transistor controlled by a first control signal and a transfer transistor controlled by a second control signal. The first and second control signals are generated based on different sets of phases. The different sets of phases are offset from each other. By having a delayed or offset set of phases, the first and second control signals may be asserted independently from each other thereby providing shorter integration time periods during a light flicker mitigation mode of operation. An additional set of phases may be added before readout operations to account for the delay and ensure proper readout operations.

20 Claims, 6 Drawing Sheets

IMAGE SENSORS WITH LIGHT FLICKER MITIGATION CAPABILITIES

BACKGROUND

This relates generally to imaging devices, and more particularly, to imaging devices having light flickering mitigation capabilities.

Image sensors are commonly used in electronic devices such as cellular telephones, cameras, and computers to capture images. In a typical arrangement, an electronic device is provided with an array of image pixels arranged in pixel rows and pixel columns. Circuitry is commonly coupled to each pixel column for reading out image signals from the image pixels.

The rows of image pixels each contain a photodiode for generating charge in response to image light. The image pixels can be configured to have light flickering mitigation capabilities. However, image pixels operating in a light flickering mitigation mode can have a set of unnecessarily long integration time periods, which can affect the effectiveness of light flickering mitigation.

It would therefore be desirable to be able to provide imaging devices with improved image sensors.

DETAILED DESCRIPTION

Electronic devices such as digital cameras, computers, cellular telephones, and other electronic devices may include image sensors that gather incoming light to capture an image. The image sensors may include arrays of image pixels. The pixels in the image sensors may include photosensitive elements such as photodiodes that convert the incoming light into image signals. Image sensors may have any number of pixels (e.g., hundreds or thousands or more). A typical image sensor may, for example, have hundreds of thousands or millions of pixels (e.g., megapixels). Image sensors may include control circuitry such as circuitry for operating the image pixels and readout circuitry for reading out image signals corresponding to the electric charge generated by the photosensitive elements.

Figure 1:
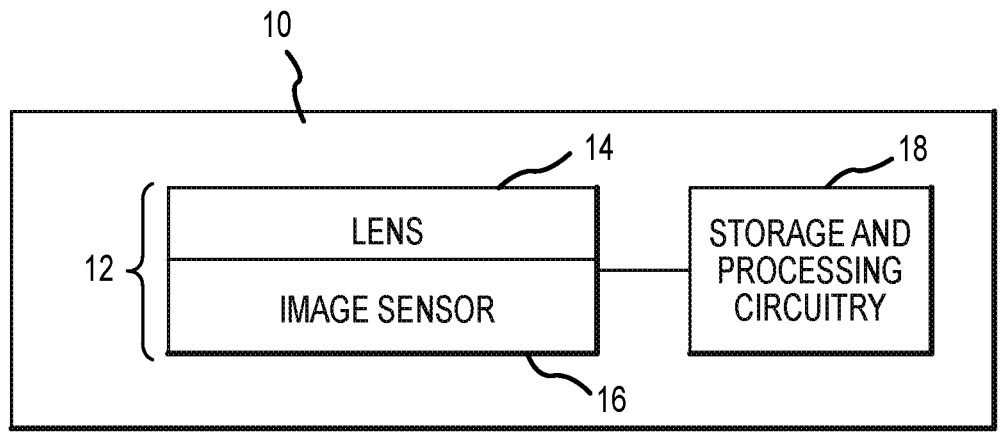
FIG. 1 is a diagram of an illustrative electronic device having an image sensor and processing circuitry for capturing images using an array of image pixels in accordance with an embodiment.

FIG. 1 is a diagram of an illustrative imaging system such as an electronic device that uses an image sensor to capture images. Electronic device 10 of FIG. 1 may be a portable electronic device such as a camera, a cellular telephone, a tablet computer, a webcam, a video camera, a video surveillance system, an automotive imaging system, a video gaming system with imaging capabilities, or any other desired imaging system or device that captures digital image data. Camera module 12 may be used to convert incoming light into digital image data. Camera module 12 may include one or more lenses 14 and one or more corresponding image sensors 16. Lenses 14 may include fixed and/or adjustable lenses and may include microlenses formed on an imaging surface of image sensor 16. During image capture operations, light from a scene may be focused onto image sensor 16 by lenses 14. Image sensor 16 may include circuitry for converting analog pixel signals into corresponding digital image data to be provided to storage and processing circuitry 18. If desired, camera module 12 may be provided with an array of lenses 14 and an array of corresponding image sensors 16.

Storage and processing circuitry 18 may include one or more integrated circuits (e.g., image processing circuits, microprocessors, storage devices such as random-access memory and non-volatile memory, etc.) and may be implemented using components that are separate from camera module 12 and/or that form part of camera module 12 (e.g., circuits that form part of an integrated circuit that includes image sensors 16 or an integrated circuit within module 12 that is associated with image sensors 16). Image data that has been captured by camera module 12 may be processed and stored using processing circuitry 18 (e.g., using an image processing engine on processing circuitry 18, using an imaging mode selection engine on processing circuitry 18, etc.). Processed image data may, if desired, be provided to external equipment (e.g., a computer, external display, or other device) using wired and/or wireless communications paths coupled to processing circuitry 18.

Figure 2:
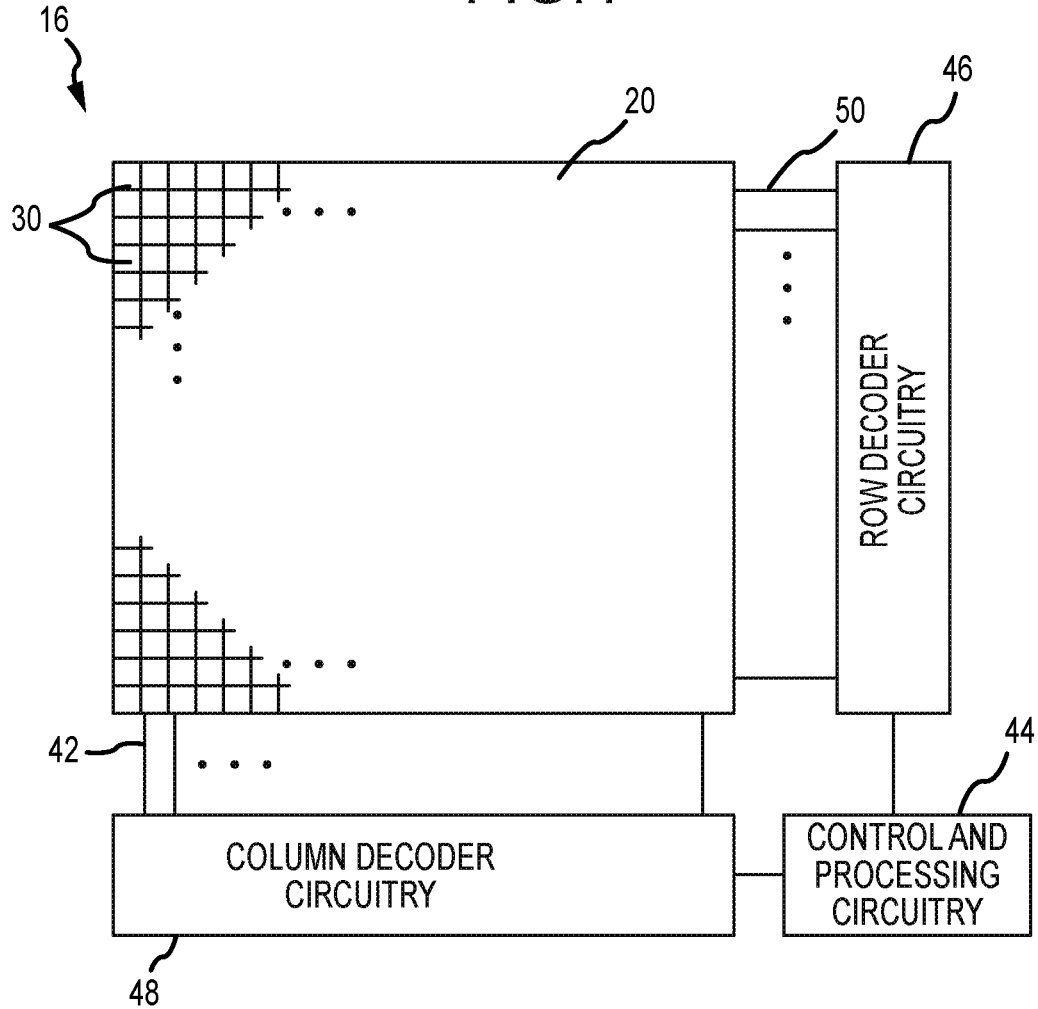
FIG. 2 is a diagram of an illustrative pixel array and associated readout circuitry for reading out image signals from the pixel array in accordance with an embodiment.

As shown in FIG. 2, image sensor 16 may include pixel array 20 containing image sensor pixels 30 (sometimes referred to herein as image pixels or pixels) arranged in rows and columns and control and processing circuitry 44 (which may include, for example, image signal processing circuitry). Pixel array 20 may contain, for example, hundreds or thousands of rows and columns of image sensor pixels 30. Control circuitry 44 may be coupled to row control circuitry 46 (sometimes referred to herein as row decoder circuitry or row circuitry) and column readout circuitry 48 (sometimes referred to herein as column control circuitry, readout circuitry, processing circuitry, or column decoder circuitry). Row control circuitry 46 may receive row addresses from control circuitry 44 and supply corresponding row control signals such as reset, row-select, charge transfer, anti-blooming, dual conversion gain, and readout control signals to pixels 30 over row control lines 50. One or more conductive lines such as column lines 42 may be coupled to each column of pixels 30 in pixel array 20. Column lines 42 may be used for reading out image signals from pixels 30 and for supplying bias signals (e.g., bias currents, bias voltages, bias voltage levels, etc.) to pixels 30. If desired, during pixel readout operations, a pixel row in array 20 may be selected using row control circuitry 46 and image signals generated by image pixels 30 in that pixel row can be read out along column lines 42.

Image readout circuitry 48 may receive image signals (e.g., analog pixel values generated by pixels 30) over column lines 42. Image readout circuitry 48 may include sample and hold circuitry for sampling and temporarily storing image signals read out from pixel array 20, amplifier circuitry, analog-to-digital conversion (ADC) circuitry, bias circuitry, column memory, latch circuitry for selectively enabling or disabling the column circuitry, or other circuitry that is coupled to one or more columns of pixels in pixel array 20 for operating pixels 30 and for reading out image signals from pixels 30. ADC circuitry in readout circuitry 48 may convert analog pixel values received from array 20 into corresponding digital pixel values (sometimes referred to as digital image data or digital pixel data). Image readout circuitry 48 may supply digital pixel data to control and processing circuitry 44 and/or processor 18 (FIG. 1) for pixels 30 in one or more pixel columns.

Pixel array 20 may be provided with a color filter array having multiple color filter elements, which allows a single image sensor to sample light of different colors. As an example, image sensor pixels such as image pixels 30 in array 20 may be provided with a color filter array which allows a single image sensor to sample red, green, and blue (RGB) light using corresponding red, green, and blue image sensor pixels arranged in a Bayer mosaic pattern. The Bayer mosaic pattern consists of a repeating unit cell of two-by-two image pixels, with two green image pixels diagonally opposite one another and adjacent to a red image pixel diagonally opposite to a blue image pixel. In another suitable example, the green pixels in a Bayer pattern are replaced by broadband image pixels having broadband color filter elements (e.g., clear color filter elements, yellow color filter elements, etc.). These examples are merely illustrative and, in general, color filter elements of any desired color and in any desired pattern may be formed over any desired number of image pixels 30. A microlens may be formed over an upper surface of the color filter array to focus incoming light onto the photosensitive region associated with that pixel 30. A microlens may be formed over an upper surface of the color filter array to focus incoming light onto the photosensitive region associated with that pixel 30.

Figure 3:
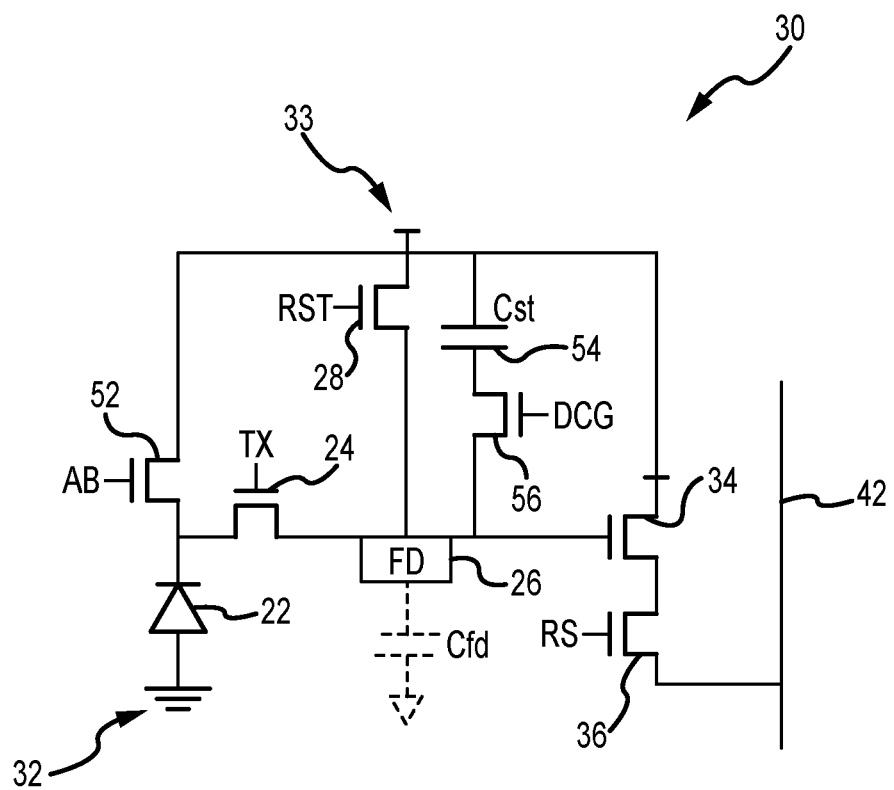
FIG. 3 is a schematic diagram of an illustrative image sensor pixel in accordance with an embodiment.

Circuitry in an illustrative image pixel 30 of image sensor 16 is shown in FIG. 3. As shown in FIG. 3, pixel 30 may include a photosensitive element such as photodiode 22 (or photodetector 22). A positive pixel power supply voltage (e.g., voltage Vaa) may be supplied at positive power supply terminal 33. A ground power supply voltage (e.g., voltage Vss) may be supplied at ground terminal 32 (sometimes referred to herein as another power supply terminal). Incoming light may be gathered by photodiode 22 after the incoming light passes through a color filter structure. Photodiode 22 may convert the light to electrical charge.

Before an image is acquired, control signal AB may be asserted to turn on (anti-blooming) transistor 52 (e.g., asserted-high to activate the corresponding transistor) and reset photodiode 22 to a reset voltage (e.g., voltage Vaa). Reset control signal RST may also be asserted. This turns on reset transistor 28 and resets charge storage node 26 (also referred to as a floating diffusion or a floating diffusion region) to a reset voltage. Reset control signal RST may then be deasserted to turn off reset transistor 28 (e.g., asserted-low to deactivate the corresponding transistor). When control signal AB is deasserted to turn off transistor 52, signal acquisition may begin at photodiode 22. After an image acquisition process is complete, transfer gate control signal TX may be asserted to turn on transfer transistor (transfer gate) 24. When transfer transistor 24 is turned on, the charge that has been generated by photodiode 22 in response to incoming light is transferred to charge storage node 26.

Charge storage node 26 may be implemented using a region of doped semiconductor (e.g., a doped silicon region formed in a silicon substrate by ion implantation, impurity diffusion, or other doping techniques). The doped semiconductor region (i.e., the floating diffusion FD) may exhibit a capacitance (e.g., capacitance Cfd) that is used to store the charge that has been transferred from photodiode 22. The signal associated with the stored charge on node 26 may be buffered by source-follower transistor 34. Row select transistor 36 may connect the source follower transistor 34 to column output line 42.

If desired, various types of image pixel circuitry may be used to implement the image pixels of image sensor 16. For example, each image sensor pixel 30 (see, e.g., FIG. 1) may be a three-transistor pixel, a pinned-photodiode pixel with four transistors, a global shutter pixel, etc. The circuitry of FIG. 3 is merely illustrative.

Still referring to FIG. 3, pixel 30 may also include overflow capacitor 54 (sometimes referred to herein as a charge storage structure) coupled to floating diffusion 26 via (overflow) transistor 56. In particular, pixel 30 may operate in an overflow mode of operation. In this mode of operation, pixel 30 may assert control signals TX and DCG (simultaneously) to activate transistors 24 and 56, respectively. Capacitor 54 may have a storage capacity that is much larger than that of floating diffusion 26. As such, capacitor 54 may be used extend the dynamic range of pixel 30 by storing large amounts of (overflow) charge (e.g., in bright image spots or scenes, during long integration periods, for charge integration).

Pixel array 20 may include pixels 30 arrange in a number of rows (e.g., arranged in rows 0-N). Each row may include multiple pixels 30, each configured with charge overflow capabilities (e.g., each pixel 30 may have at least one overflow transistor and at least one overflow capacitor 54). The scenario where pixel array 20 includes one or more pixels having a pixel configuration shown and described in connection with FIG. 3 is described herein as an example. If desired, one or more pixels in pixel array 20 may have any other suitable pixel configuration.

Pixel 30 may also operate in an LFM mode of operation, where control signals AB and TX (optionally in combination with control signal DCG) are asserted in an interweaved manner (e.g., alternatingly asserted) to acquire an image signal effectively during a short exposure period (e.g., multiple short integration periods within a long exposure period). In other words, to use control signals AB and TX/DCG in the interweaved manner, when control signal AB is asserted-high, control signals TX and DCG are asserted-low, and vice versa. Operating pixel 30 in an LFM mode allows pixel 30 to capture incident light that may otherwise evade capture due to flickering effects.

Figure 4:
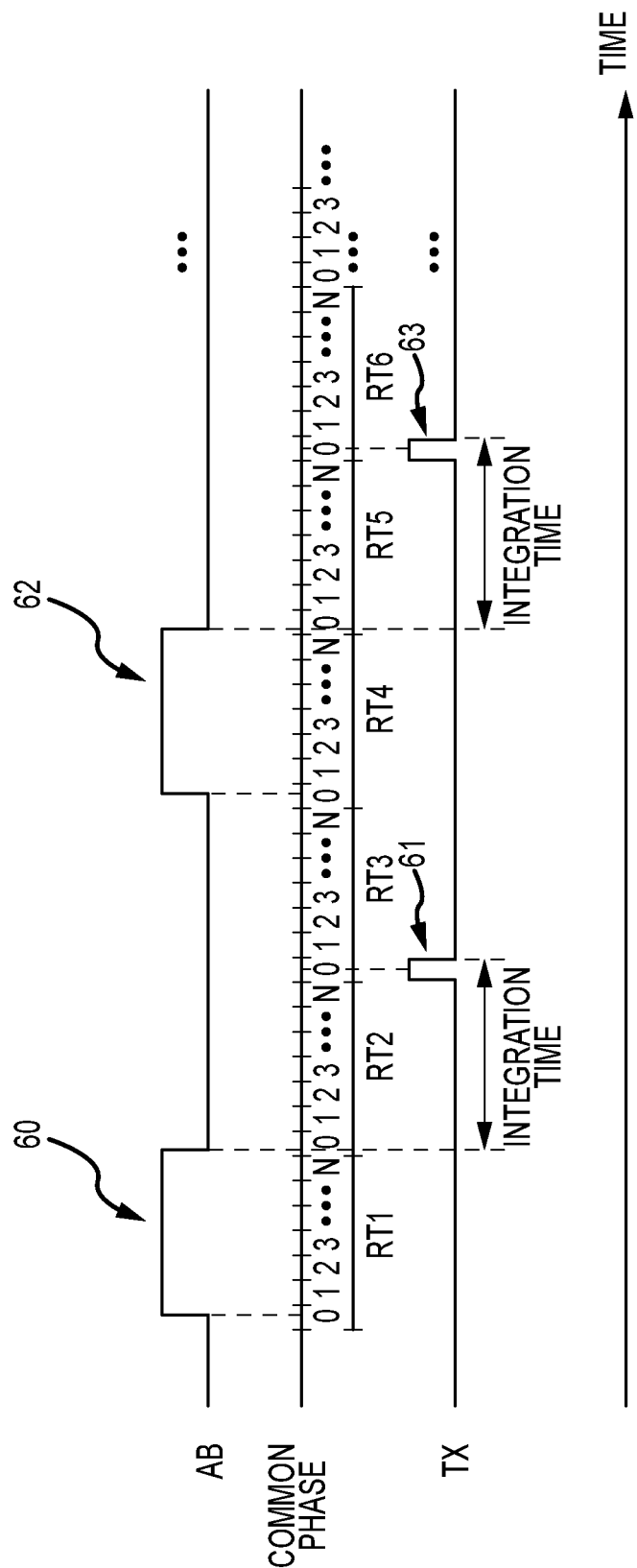
FIG. 4 is an illustrative timing diagram for operating an image pixel in a light flickering mode of operation using a common phase for different control signals in accordance with an embodiment.

In particular, FIG. 4 shows an illustrative timing diagram for operating an image sensor such as an image sensor having pixel 30 in FIG. 3 in a light flickering mitigation mode during an image acquisition time period. Pixel 30 may receive control signals AB and TX, among other control signals. Control signals AB and TX may share a common phase. More specifically, a set of phases 0, 1, 2, 3, . . . N may form a row time period RT. Each phase in a row time may correspond to a time period during which control signal assertions and deassertions occur for a particular pixel row in pixel array 20. As an example, control signals AB and TX in FIG. 4 may correspond to a pixel in row 0 of pixel array 20. In this scenario, a transition of a corresponding control signal may occur only during phase 0 of each row time period. Each phase in row time may correspond to action taken by a respective row in pixel array 20 such that control schemes of array 20 may occur in an organized rolling manner.

As shown in FIG. 4, image acquisition during an LFM mode may begin with assertion 60 of control signal AB. If desired, assertion 60 may be the same assertion of control signal AB during a pixel reset time period. Assertion 60 may have a low to high transition (e.g., when control signal AB is asserted) at phase 0 of a first period RT1. Assertion may have a high to low transition (e.g., when control signal AB is deasserted) at phase 0 of a second period RT2. Subsequently, control signal TX may be pulsed (e.g., control signal TX may be asserted and deasserted) at phase 0 of a third period RT3 (i.e., assertion 61). The time period between the deassertion of assertion 60 and the deassertion of assertion 61 may a first integration time for an LFM image signal. Charge generated during the first integration time may be transferred to a charge storage structure (e.g., floating diffusion 26 and/or overflow capacitor 54 in FIG. 3).

Image acquisition during an LFM mode may include many short integration times over a long exposure period, which increases the likelihood of capturing flickering light during at least one or more of the short integration times. As an example, subsequently to assertion 61, control signal AB may again be asserted during phase 0 of a fourth period RT4 and deasserted during phase 0 of a fifth period RT5 (i.e., assertion 62). Thereafter control signal TX may be pulsed at phase 0 of a sixth period RT6 (i.e., assertion 63). Similarly, the time period between the deassertion of assertion 62 and the deassertion of assertion 63 may be a second integration time an LFM image signal. Charge generated during the second integration time may be transferred to a charge storage structure (e.g., floating diffusion region 26 and/or overflow capacitor 54 in FIG. 3) and summed with the charge generated during the first integration time and charge generated during any subsequent integration time. Assertions of control signals AB and TX may occur in the interweaved manner as shown in FIG. 4 for any desirable number of times to generate any corresponding charge during respective integration times.

However, it may be desirable to shorten each of the respective integration times. In particular, more charge is generated during longer integration times. The more charge each integration time generates, the fewer integration times it will take to reach the capacity of the floating diffusion region. Therefore, in order to avoid to avoid undesirable overflow effects at the floating diffusion region, the number of integration times will be limited. By shortening the integration times, during the same exposure period, a larger number of integration times may occur thereby enhancing light flickering mitigation capacities of the image sensor. Additionally, because a particular pixel may receive control signals AB and TX that share a particular phase in row time, the minimum integration time is limited by the row time (e.g., at least one row time). As an example, when control signal AB is deasserted at phase 0 to begin the integration time period, the earliest control signal TX can only be pulsed is at phase 0 of the subsequent row time.

To mitigate these issues, control signal generation circuitry (e.g., row circuitry 46 and/or control circuitry 44 in FIG. 2) may generate control signals that are associated with respective phases (e.g., that each have a set of respective phases). Control signal generation circuitry may generate control signal AB according to AB phases (e.g., based on an AB phase signal or an AB clocking signal). Control signal generation circuitry may generate control signal TX according TX phases (e.g., based on a TX phase signal or a TX clocking signal). In this example, each phase in the AB phases do not have to align to a corresponding phase in the TX phases (e.g., phase 0 in AB phases does not occur simultaneously with phase 0 in TX phases).

Figure 5:
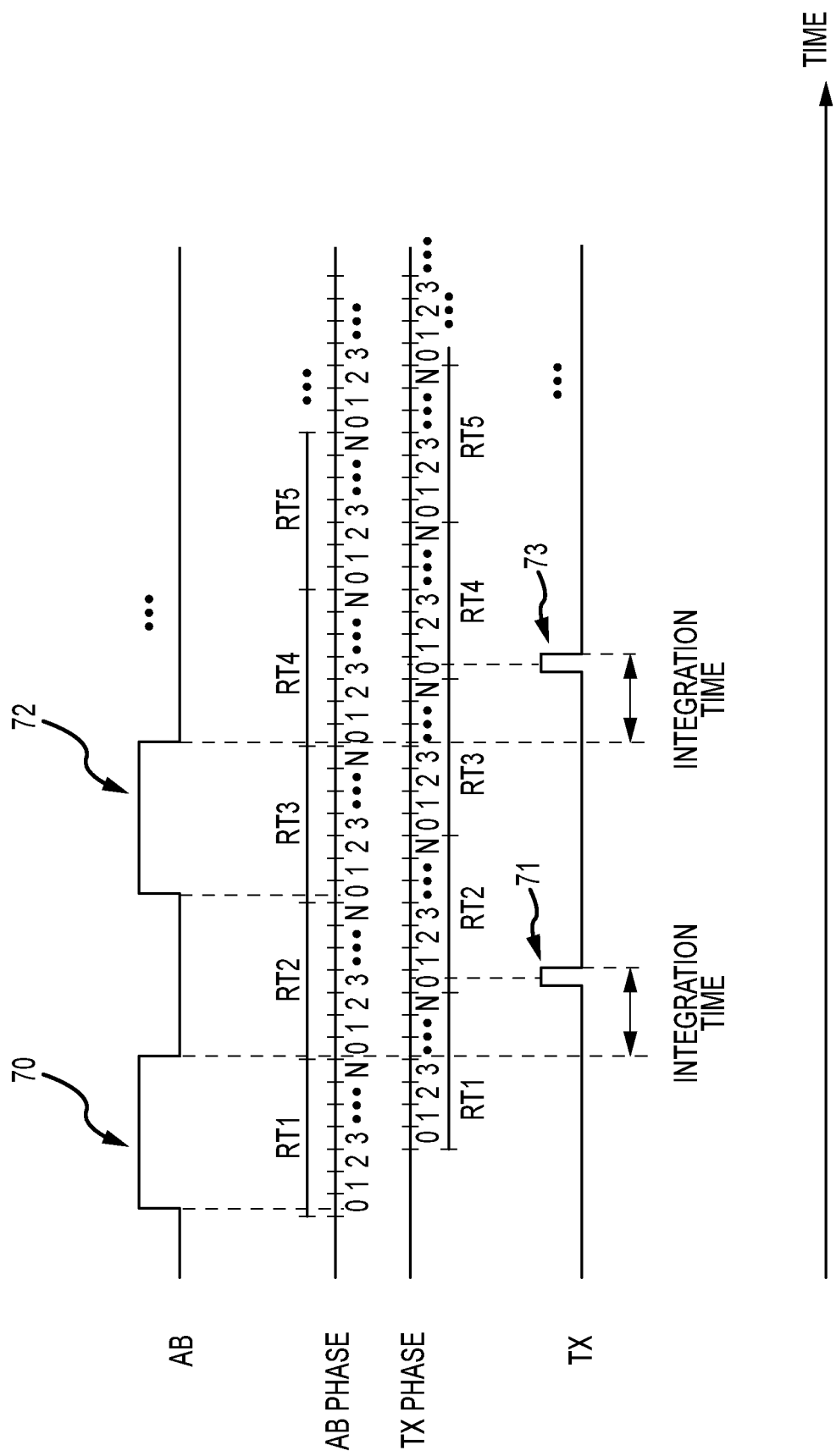
FIG. 5 is an illustrative timing diagram for operating an image pixel in a light flickering mode of operation using different phases for corresponding control signals in accordance with an embodiment.

FIG. 5 shows an illustrative timing diagram for operating an image sensor such as an image sensor having pixel 30 in FIG. 3 in a light flickering mitigation mode using different sets of phases for control signals AB and TX. In particular, image acquisition may similarly begin with assertion 70 of control signal AB. Control signal AB may be asserted during phase 0 in first row time period RT1 for AB phases and may be deasserted during phase 0 in second row time period RT2 for AB phases. Subsequent to assertion 70 assertion 71 of control signal TX may occur. Control signal TX may be pulsed during phase 0 of second row time period RT2 for TX phases. The labeling of RT1, RT2, etc., is merely for clarity. Each of time periods RT1, RT2, for both AB and TX phases may corresponding to a pre-determined constant time period.

As shown in FIG. 5, there is an offset between the AB phases and the TX phases. As an example, phase 0 for TX phases may correspond (align with) to phase 3 of AB phases. This is merely illustrative. If desired, any suitable offset may be provided between the AB phases and the TX phases. As an example, there may be a single-phase offset between AB phases and TX phases (e.g., phase 0 of TX phases may corresponding to phase 1 of AB phases). As further examples, there may be two-phase offsets, three-phase offsets, offsets of more than three phases, etc., between the AB phases and the TX phases. Control signal generation circuitry may be configured (by processing circuitry 18 in FIG. 1) to generate different sets of phases for different control signals, where the phases are offset. In other words, control signal generation circuitry may generate control signals having different offsets or delays to provide programmable delay sub-row time control (e.g., fine integration time control).

In the example of FIG. 5, by providing a three-phase offset between AB phases and TX phases, the minimum integration time is three phases instead of a row time (e.g., N phases) as in the example of FIG. 4. Additionally, subsequent assertions of control signal AB may be more compact. As an example, control signal AB may be subsequently asserted at phase 0 of third row time period RT3 (instead of at a fourth period RT4 in FIG. 4). A corresponding control signal TX assertions may occur at phase 0 of fourth row time period RT4. Image acquisition may continue in this interweaved manner (e.g., where control signal AB is asserted during AB phase 0 of an (i)th row time period and is deasserted during AB phase 0 of an (i+1)th row time period, and wherein control signal TX is asserted during TX phase 0 of an (i+1)th row time period) until a last set of TX and AB control signal assertions.

Figure 6:
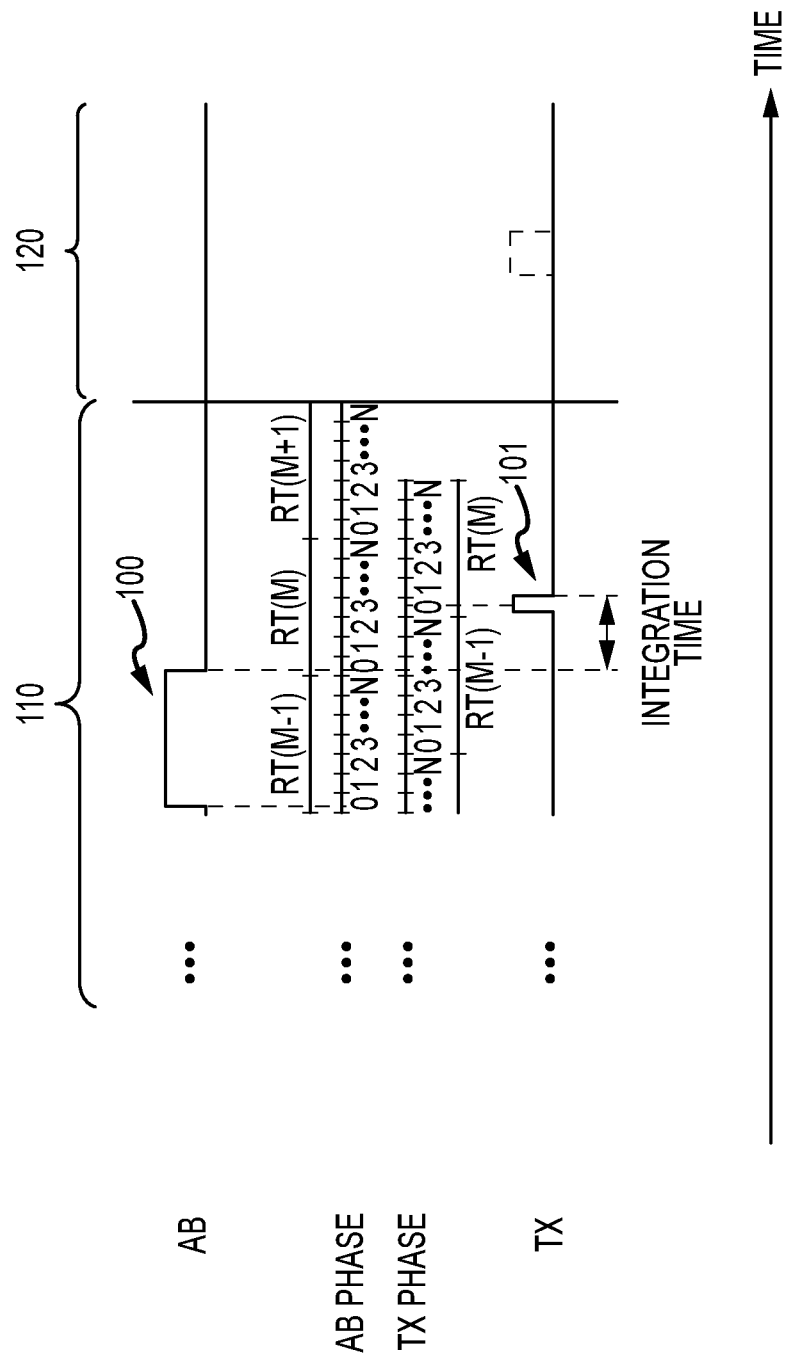
FIG. 6 is an illustrative timing diagram for operating an image pixel in a light flickering mode of operation using different phases for corresponding control signals in accordance with an embodiment.

As shown in FIG. 6, image acquisition period 110 may end with a final AB and TX control signal assertion pair (i.e., assertions 100 and 101). For reasons described above, row time periods RT(M−1) and RT(M) for AB phases may be necessary to generate assertion 100. Similarly, row time period RT(M) for TX phases may be necessarily to generation assertion 101. In addition to these necessary row time periods, an additional row time period RT(M+1) may be inserted to account for the delay between the AB and TX phases. Readout period 120 may occur only after the additional row time period RT(M+1) for AB phases.

The examples of FIGS. 5 and 6 are merely illustrative. In particular, although each of the integration times in FIGS. 5 and 6 is illustrated to be less than one row time (e.g., three phases), this is merely illustrative. If desired, each integration time may be one row time and three phases, two row time and three phases, etc. By providing an offset between AB phases and TX phases, not only can a shorter integration time be achieved, but an integration time having better resolution can be achieved. As an example, whereas an integration time in FIG. 4 can last one row time, two row time, or any other complete row time, an integration time in FIGS. 5 and 6 can last one and an Nth row time, one and two Nth row time, etc. As another example, control signal generation circuitry can provide any Nth resolution integration time under or above one row time (e.g., by providing control signals with programmable delays with respect to one another).

Furthermore, although FIGS. 5 and 6 are described in connection with control signals AB and TX, this is merely illustrative. If desired, any other control signal (e.g., control signals RST, DCG, RS, etc.) may be provided using a separate set of phases having an offset from phases associated with another control signal. By providing a phase offset between any two control signals, finer control can be achieved for a given pixel receiving the two control signals. In other words, during a single row time period, the given pixel in a pixel row may be configured to effectively have multiple "phases" for the pixel row.

Additionally, various control signals and assertions of the control signals during a pixel reset time period, an image acquisition time period (e.g., period 110 in FIG. 6), an image readout time period (e.g., period 120 in FIG. 6), and any other periods have been omitted for the sake of clarity (e.g., in order to not unnecessarily obscure FIGS. 5 and 6). If desired, control signals may be asserted to reset any charge storage regions to a reference voltage during the pixel reset time period and/or before the image acquisition time period. If desired, control signals may be asserted to readout various generated charge in any charge storage regions and/or be asserted to readout various reset level signals during the image readout time period.

Figure 7:
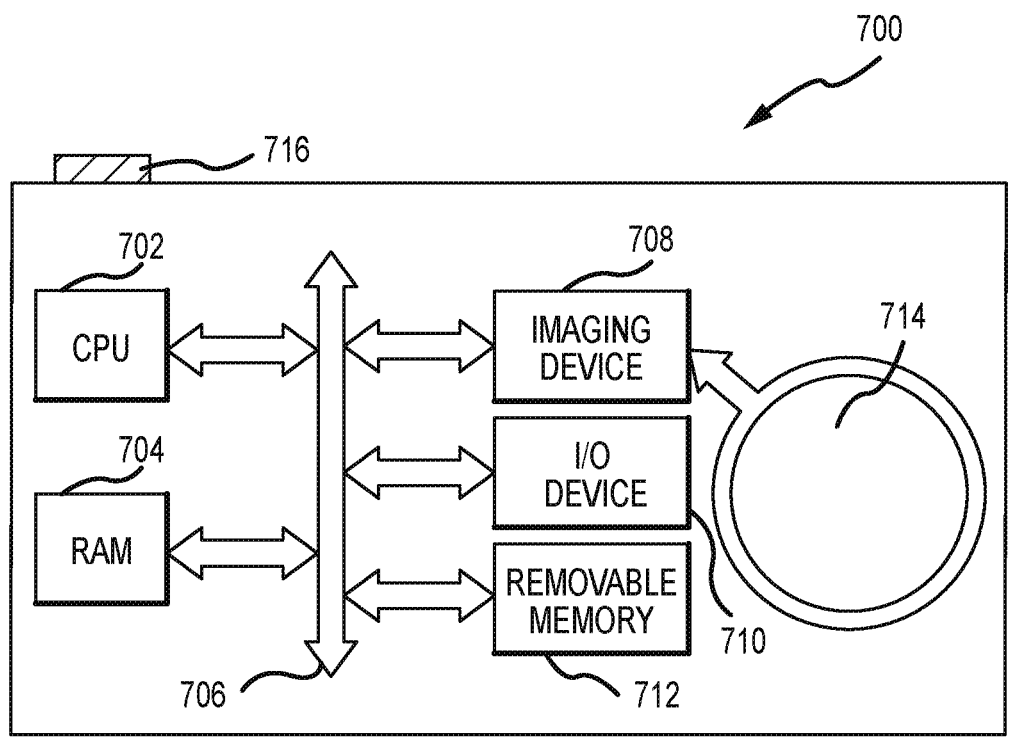
FIG. 7 is a block diagram of a processor system employing the embodiments of FIGS. 1-6 in accordance with an embodiment.

FIG. 7 is a simplified diagram of an illustrative processor system 700, such as a digital camera, which includes an imaging device 708 (e.g., camera module 12 of FIG. 1) employing an image sensor as described above in connection with FIGS. 1-6. Without being limiting, such a system could include a computer system, still or video camera system, scanner, machine vision system, vehicle navigation system, video phone, surveillance system, auto focus system, star tracker system, motion detection system, image stabilization system, and other systems employing an imaging device.

Processor system 700, for example a digital still or video camera system, generally includes a lens 714 for focusing an image onto one or more pixel array in imaging device 708 when a shutter release button 716 is pressed and a central processing unit (CPU) 702 such as a microprocessor which controls camera and one or more image flow functions. Processing unit 702 can communicate with one or more input-output (I/O) devices 710 over a system bus 706. Imaging device 708 may also communicate with CPU 702 over bus 706. System 700 may also include random access memory (RAM) 704 and can optionally include removable memory 712, such as flash memory, which can also communicate with CPU 702 over the bus 706. Imaging device 708 may be combined with the CPU, with or without memory storage on a single integrated circuit or on a different chip. Although bus 706 is illustrated as a single bus, it may be one or more busses, bridges or other communication paths used to interconnect system components of system 700.

Various embodiments have been described illustrating systems with and methods for image sensors configured with light flickering mitigation functionalities.

In an embodiment, an image sensor may include an image pixel array having image pixel arranged in columns and rows. A particular image pixel in a particular row may be configured to receive first and second control signals. Control signal generation circuitry may be configured to generate the first and second control signals based on respective first and second sets of phases. The second set of phases may have a phase offset with respect to the first set of phases. In particular, each phase in the first set of phases and each phase in the second set of phases may be (separately) associated with a respective row in the rows. As an example, the first control signal may be asserted during a given phase in the first set of phases associated with the given row, and the second control signal may be asserted during a given phase in the second set of phases associated with the given row. The given phase in the first set of phases associated with the given row may have the phase offset with respect to the given phase in the second set of phases associated with the given row.

Additionally, the particular image pixel may include a photodiode coupled to a voltage supply terminal via a first (anti-blooming) transistor and may include a second (charge transfer) transistor coupling the photodiode to a floating diffusion region. The first transistor may be configured to receive the first control signal, and the second transistor may be configured to receive the second control signal.

To operate the image pixel in an LFM mode of operation, the control signal generation circuitry may be configured to alternatively assert the first and second control signals. A time period between a deassertion of the first control signal and a corresponding deassertion of the second control signal comprises an integration time period. Many such integration time periods, including a final integration time period, may occur. Charge generated during the integration time periods may be accumulated to generate an LFM image signal. Before a pixel readout time period, the control signal generation circuitry may be configured to provide an additional set of phases associated with the first control signal, during which the first control signal is deasserted. The additional set of phases associated with the first control signal may temporally overlap with at least a portion of the second set of phases.

A method for operating the image sensor may include, with the control signal generation circuitry, asserting the first control signal during a given phase in the first set of phases, deasserting the first control signal during the given phase in the second set of phases, and pulsing the second control signal during the given phase in the third set of phases. The given phase in the third plurality of phases may be shifted by a number of phases less than the second plurality of phases. The number of phases may determine an integration time for the pixel. The first, second, and third plurality of phases have the same number of phases, which is associated with a row time. The method may include, with the pixel, generating charge in response to image light during the integration time, generating additional charge in response to image light during an additional plurality of integration times, and generating the LFM signal image signal by accumulating the charge and the additional charge. The additional plurality of integration times may include a final integration time. The control signal generation circuitry may generate an additional plurality of phases after the final integration time.

The foregoing is merely illustrative of the principles of this invention and various modifications can be made by those skilled in the art without departing from the scope and spirit of the invention. The foregoing embodiments may be implemented individually or in any combination.

What is claimed is:

1. An image sensor, comprising:
    an image pixel configured to receive first and second control signals; and
    control signal generation circuitry configured to:
        assert the first control signal at a phase during a first row time period for the first control signal,
        deassert the corresponding asserted first control signal at the phase during a second row time period for the first control signal, and
        control the second control signal at the phase during a row time period for the second control signal,
        wherein the phase during the first row time period and the phase during the second row time period are separated by a first number of phases, and wherein the phase during the second row time period and the phase during the row time period for the second control signal are separated by a second number of phases that is fewer than the first number of phases.

2. The image sensor defined in claim 1, comprising:
    image pixels arranged in a plurality of columns and a plurality of rows, wherein the image pixel is in a given row in the plurality of rows, wherein the second row time period has a set of phases, which includes the phase, and wherein each phase in the second row time period is associated with a respective row in the plurality of rows.

3. The image sensor defined in claim 2, wherein the row time period for the second control signal has the set of phases, and wherein each phase in the row time period for the second control signal is associated with a corresponding row in the plurality of rows.

4. The image sensor defined in claim 1, wherein the asserted first control signal remains asserted for a single row time period.

5. The image sensor defined in claim 1, wherein the image pixel includes a photodiode coupled to a voltage supply terminal via a first transistor, and includes a second transistor coupling the photodiode to a floating diffusion region, wherein the first transistor is configured to receive the first control signal, and wherein the second transistor is configured to receive the second control signal.

6. The image sensor defined in claim 5, wherein the control signal generation circuitry is configured to alternatingly assert the first and second control signals during a light flickering mitigation mode of operation.

7. The image sensor defined in claim 6, wherein the second number of phases that separates the phase during the second row time period and the phase during the row time period for the second control signal forms an integration time period.

8. The image sensor defined in claim 7, wherein an additional number of phases that separates the phase during an additional row time period for the first control signal and the phase during an additional row time period for the second control signal forms an additional integration time period.

9. The image sensor defined in claim 8, wherein the photodiode generates a first amount of charge during the integration time period and a second amount of charge during the additional integration time period and wherein at least the first and second amounts of charge are combined to generate an image signal.

10. The image sensor defined in claim 6, wherein a time period between a deassertion of the first control signal and a corresponding deassertion of the second control signal comprises a final integration time period before a pixel readout time period, wherein the control signal generation circuitry is configured to provide an additional row time period for the first control signal between the final integration time period and the pixel readout time period, and wherein the first control signal is deasserted during the additional row time period.

11. The image sensor defined in claim 10, wherein the additional row time period for the first control signal temporally overlap with at least a row time period during which the corresponding deassertion of the second control signal occurs.

12. A method of operating an image sensor that includes control signal generation circuitry coupled to a pixel in the image sensor, the method comprising:
    with the control signal generation circuitry, asserting a first control signal during a given phase in a first plurality of phases;
    with the control signal generation circuitry, deasserting the corresponding asserted first control signal during the given phase in a second plurality of phases, the second plurality of phases having a same number of phases as the first plurality of phases;
    with the control signal generation circuitry, pulsing a second control signal during the given phase in a third plurality of phases, wherein the given phase in the third plurality of phases is separated from the given phase in the second plurality of phases by an additional number of phases that is not an integral multiple of the plurality same number of phases; and
    at the pixel, receiving the first and second control signals.

13. The method defined in claim 12, wherein a time period from the deasserting of the corresponding asserted first control signal and the pulsing of the second control signal determines an integration time for the pixel.

14. The method defined in claim 13, wherein the first, second, and third plurality of phases have the same number of phases.

15. The method defined in claim 14, wherein the same number of phases, collectively, is associated with a row time.

16. The method defined in claim 13, further comprising:
    with the pixel, generating charge in response to image light during the integration time;
    with the pixel, generating respective additional charges in response to image light during an additional plurality of corresponding integration times; and
    at the pixel, generating a light flicker mitigation image signal by accumulating the charge and each of the respective additional charges.

17. The method defined in claim 16, wherein the additional plurality of corresponding integration times comprises a final integration time, the method further comprising:
    with the control signal generation circuitry, generating an additional plurality of phases for the first control signal after the final integration time.

18. A system, comprising:
    input-output circuitry;
    processing circuitry; and
    an image sensor that includes control circuitry and image pixels arranged in a plurality of columns and a plurality of rows, wherein a given image pixel in a given row is configured to receive first and second control signals from the control circuitry, wherein the control circuitry is configured to control the first control signal during a first set of sequential row time periods, each row time period having a first number of phases and configured to control the second control signal during a second set of sequential row time periods, each row time period having the first number of phases, and wherein the first set of sequential row time periods is temporally offset from the second set of sequential row time periods by a second number of phases fewer than the first number of phases.

19. The system defined in claim 18, wherein the given image pixel comprises an anti-blooming transistor that receives the first control signal and a charge transfer transistor that receives the second control signal.

20. The system defined in claim 18, wherein each phase in each row time period in the first set of row time periods is associated with when the control circuitry controls a type of control signals for image pixels in a corresponding row in the plurality of rows, and each phase in each row time period in the second set of row time periods is associated with when the control circuitry controls an additional type of control signals for image pixels in the corresponding row in the plurality of rows.

* * * * *